United States Patent Office 2,763,628
Patented Sept. 18, 1956

2,763,628
NEW COMPOSITIONS OF MATTER

William L. Bruce, Norrkoping, Sweden, assignor, by mesne assignments, to The Goodyear Tire & Rubber Company, a corporation of Ohio No Drawing. Application March 17, 1953, Serial No. 342,972

6 Claims. (Cl. 260—28)

This invention relates to new compositions of matter. More particularly it relates to synthetic elastomeric materials. Still more particularly it relates to elastomeric isocyanate-modified linear polyesters to which another material has been added in order to improve the physical properties of the cured elastomer.

The particular elastomeric materials used in the present invention are those described in co-pending applications Serial Numbers 187,696 filed September 29, 1950 now United States Patent 2,625,532; 305,914, filed August 22, 1952; 307,900 filed September 4, 1952; and 312,161, filed September 29, 1952 now United States Patent 2,625,535. These materials, which will be further described below, will be hereinafter referred to as elastomeric isocyanate-modified linear polyesters.

An object of this invention is to improve the physical properties of the cured polymers prepared from elastomeric isocyanate-modified linear polyesters.

While each class of elastomeric isocyanate-modified linear polyesters has been fully described in the applications referred to above, the general chemical reactions involved in their preparation may be represented by the following illustrations in which R, R' and R" denote divalent organic radicals.

PREPARATION OF POLYESTER (1)
$$n(HO-R-OH) + n(HO-\overset{O}{\underset{\|}{C}}-R'-\overset{O}{\underset{\|}{C}}-OH)$$

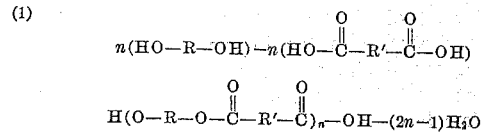

in which $n$ is a positive whole number denoting the degree of polymerization of the polyester formed.

PREPARATION OF POLYESTERAMIDE (2)
$$n(HO-R-NH_2) + n(HO-\overset{O}{\underset{\|}{C}}-R'-\overset{O}{\underset{\|}{C}}-OH) \longrightarrow$$

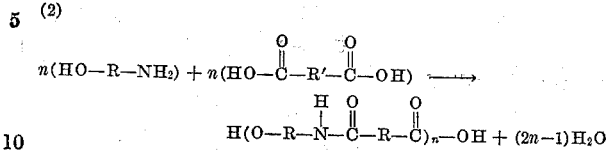

PREPARATION OF DIISOCYANATE-MODIFIED POLYESTER (3)
HO—polyester—COOH + OCN—R"—NCO ⟶

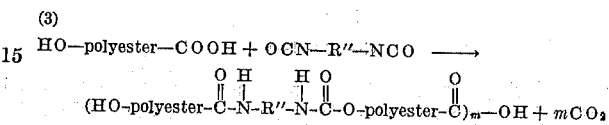

in which $m$ is a positive whole number denoting the number of segments in the diisocyanate-modified, chain-extended polymer.

PREPARATION OF DIISOCYANATE-MODIFIED POLYESTERAMIDE (4)
HO—polyesteramide—COOH + OCN—R"—NCO ⟶

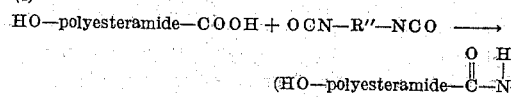

in which $m$ is a positive whole number denoting the number of segments in the diisocyanate-modified, chain-extended polymer.

PREPARATION OF DIISOCYANATE-MODIFIED INTERPOLYMERS (5)
HO—polyester—COOH + H₂N—R"—NH₂ + OCN—R'"—NCO ⟶

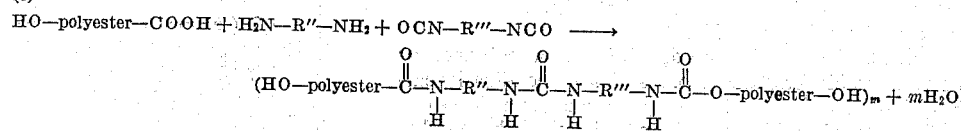

(6)
HO—polyester—COOH + H₂N—R"—OH + OCN—R'"—NCO ⟶

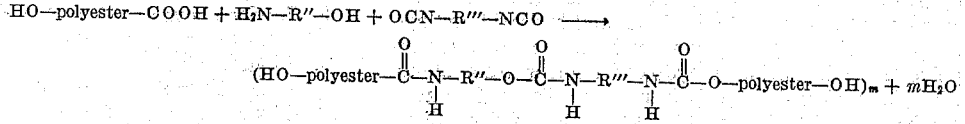

(7)
HO—polyester—COOH + H₂N—R"—COOH + OCN—R'"—NCO ⟶

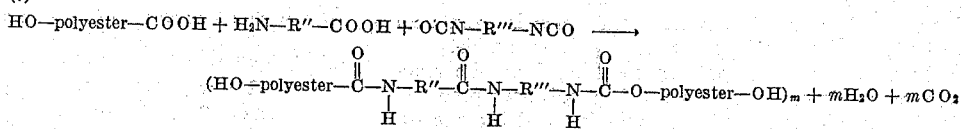

in which R" and R'" represent divalent organic radicals and $m$ represents a positive whole number denoting the number of segments in the modified chain-extended interpolymer.

Equations 3, 4, 5, 6 and 7 represent the reactions which may take place in forming the uncured elastomeric polymers according to the limitations as to acid number, hydroxyl number, amino groups, bifunctional additives, and amount of particular diisocyanate used in their preparation, described in our co-pending applications referred to above.

The curing or cross-linking of the uncured polymers takes place as the result of reaction between the —NCO groups in the curing agent and the reactive hydrogens in certain groups present in the chain of the extended polymer and certain terminal groups at the ends of the chain-extended units. The terminal groups include, of course, hydroxyl, carboxyl, and amino radicals. The groups along the chain include the groups formed by reaction between an —NCO group and a carboxyl, hydroxyl, or amino group, and may be represented as a substituted amide linkage

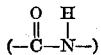

a carbamic radical

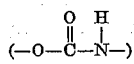

and a ureylene radical

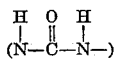

respectively. Each of these groupings has at least one active hydrogen available for reaction with the —NCO group of the polyisocyanate used to effect a cure.

The elastomeric diisocyanate-modified linear polyesters described in the co-pending applications referred to above may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyesteramide having a hydroxyl number from 40 to 100 (the preferred range is from 50 to 60) and an acid number from 0 to 7; and (2) at least one diisocyanate selected from the group consisting of 4,4'-diphenyl diisocyanate; 4,4'-diphenylene methane diisocyanate, dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 (the preferred range is from 0.90 to 0.99) mol per mol of polyester or polyesteramide.

Second, the reaction product of (1) a polyester or polyesteramide prepared from at least one dibasic carboxylic acid, and at least one glycol and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (the preferred range is from 50 to 60) and an acid number from 0 to 12; and (2) at least one tolylene diisocyanate, the diisocyanate being used in an amount ranging from 0.85 to 1.10 (a preferred range is from 0.90 to 1.00) mol per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 (the preferred range is from 50 to 60) and an acid number from 0 to 12; (2) at least one bifunctional additive consisting of diamines, amino alcohols, dicarboxylic acids, hydroxy carboxylic acids, amino carboxylic acids and the ureas, guanidines, and thioureas containing a primary amino group, said bifunctional additive being used in an amount such that the total number of —NH₂ and —COOH equivalents present in said bifunctional reactant shall be from 0.06 to 0.24 equivalent per mol of polyester, and (3) at least one tolylene diisocyanate, the diisocyanate being used in an amount equal to the sum of from 0.85 mol to 1.10 (a preferred range is from 0.90 to 1.00) mol of diisocyanate per mol of polyester plus the molar amount of diisocyanate equivalent to the mols of said bifunctional additive used.

Fourth, the reaction product resulting from the reaction of mixture comprising (1) a polyester prepared from bifunctional ingredients including at least one dibasic carboxylic acid containing at least three carbon atoms and at least one glycol, said polyester having a hydroxyl number between 40 and 100 (the preferred range is from 50 to 60) and an acid number from 0 to 7; (2) at least one bifunctional additive selected from the group consisting of diamines, amino alcohols, dicarboxylic acids, hydroxy carboxylic acids, amino carboxylic acids, and the ureas, guanidines, and thioureas containing a primary amino group, said bifunctional additive being used in an amount such that the total number of —NH₂ and —COOH equivalents present in said bifunctional reactant shall be from 0.06 to 0.48 equivalent per mol of polyester, and (3) at least one diisocyanate selected from the group consisting of 4,4'-diphenyl diisocyanate; 4,4'-diphenylene methane diisocyanate; 4,4'-tolidine diisocyanate, dianisidine diisocyanate; 1,5-napthalene diisocyanate; 4,4'-diphenyl ether diisocyanate, and p-phenylene diisocyanate, the diisocyanate being used in an amount equal to the sum of from 0.70 mol to 0.99 (the preferred range is from 0.90 to 0.99) mol of diisocyanate per mol of polyester plus the molar amount of diisocyanate equivalent to the mols of bifunctional additive used.

Listed below are the reactants used to form some preferred linear polyesters and polyesteramides which, when prepared and subsequently modified by a diisocyanate and, optionally, a bifunctional additive in accordance with the appropriate limitations indicated in the description of the four types of synthetic elastomers, will produce elastomeric product:

1. Ethylene glycol plus adipic acid.
2. Propylene glycol 1,2 plus adipic acid.
3. Ethylene glycol (80 mol percent), propylene glycol 1,2 (20 mol percent) plus adipic acid.
4. Ethylene glycol (80 mol percent), propylene glycol 1,2 (20 mol percent) plus azelaic acid.
5. Ethylene glycol (80 mol percent), propylene glycol 1,2 (20 mol percent) plus sebacic acid.
6. Ethylene glycol (80 mol percent), propylene glycol 1,2 (20 mol percent) plus dilinoleic acid (20 mol percent), adipic acid (80 mol percent).
7. Ethylene glycol (80 mol percent), glycerine monoethyl ether (20 mol percent) plus adipic acid.
8. Ethylene glycol (80 mol percent), butylene glycol 1,4 (20 mol percent) plus adipic acid.
9. Ethylene glycol (80 mol percent), propylene glycol 1,3 (20 mol percent) plus adipic acid.
10. Ethylene glycol (80 mol percent), pentane diol 1,5 (20 mol percent) plus adipic acid.
11. Ethylene glycol (80 mol percent), glycerine monoisopropyl ether (20 mol percent) plus adipic acid.
12. Ethylene glycol (80 mol percent), propylene glycol 1,2 (from 18 to 5 mol percent), ethanol amine (from 2 to 15 mol percent), plus adipic acid.
13. Ethylene glycol (80 mol percent), propylene glycol 1,2 (20 mol percent) plus maleic acid (from 3 to 6 mol percent), adipic acid (from 97 to 94 mol percent).
14. Ethylene glycol (80 mol percent), propylene glycol 1,2 (from 19 to 17 mol percent), piperazine (from 1 to 3 mol percent) plus adipic acid.
15. Ethylene glycol (80 mol percent), propylene glycol 1,2 (from 18 to 5 mol percent), dihydroxyethyl aniline (from 2 to 15 mol percent) plus adipic acid.
16. Ethylene glycol (80 mol percent), diethylene glycol (20 mol percent) plus adipic acid.
17. Ethylene glycol (from 90 to 10 mol percent), propylene glycol 1,2 (from 10 to 90 mol percent) plus adipic acid.
18. Ethylene glycol (from 90 to 10 mol percent), propylene glycol 1,2 (from 10 to 90 mol percent) plus azelaic acid.

The diisocyanates which are preferred when used to form the unvulcanized modified polyesters and polyesteramides, are 4,4'-diphenyl diisocyanate; 1,5-naphthalene diisocyanate; 4,4'-diphenylene methane diisocyanate, and the meta tolylene diisocyanates, such as 2,4 and 2,6-tolylene diisocyanate. If meta tolylene diisocyanate is to be used, a convenient method of adding it is in the form of one of its dimers such as the dimer of 2,4-tolylene diisocyanate of the following formula:

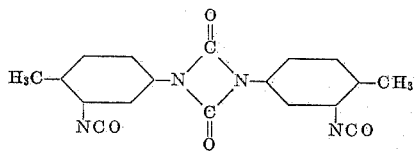

The dimer is less toxic than the monomeric material.

Of the first class of elastomeric polymers described above, those of particular interest are the rubber-like polymers resulting from polyethylene adipate modified by 4,4'-diphenyl diisocyanate; 1,5-naphthalene diisocyanate; 4,4'-diphenylene methane diisocyanate, or mixtures thereof, polypropylene 1,2 adipate modified by 4,4'-diphenyl diisocyanates; 1,5-naphthalene diisocyanate; 4,4'-diphenylene methane diisocyanate, or mixtures thereof; polyethylene (80 mol percent) propylene 1,2 (20 mol percent) adipate modified by 4,4'-diphenyl diisocyanate; 1,5-naphthalene diisocyanate; 4,4'-diphenyl methane diisocyanate, or mixtures thereof; polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof; and polyethylene (80 mol percent) propylene 1,2 (from 19 to 17 mol percent) piperazine (from 1 to 3 mol percent) adipate modified by 4,4'-diphenyl diisocyanate; 1,5-naphthalene diisocyanate; 4,4'-diphenylene methane diisocyanate, or mixtures thereof. These polymers, when cured, have been found to possess outstanding physical properties.

Of the second class of elastomeric polymers described above, those of particular interest are the rubber-like polymers resulting from polyethylene adipate modified by a meta tolylene diisocyanate; polypropylene 1,2 adipate modified by a meta tolylene diisocyanate; polyethylene (80 mol percent) propylene 1,2 (20 mol percent) adipate modified by a meta tolylene diisocyanate; polyethylene (80 mol percent) propylene 1,2 (20 mol percent) azelate modified by a meta tolylene diisocyanate; and polyethylene (80 mol percent) propylene 1,2 (from 19 to 17 mol percent) piperazine (from 1 to 3 mol percent) adipate modified by a meta tolylene diisocyanate. Mixtures of meta tolylene diisocyanates such as mixtures of 2,4- and 2,6-tolylene diisocyanates may also be used.

Of the third class of elastomeric interpolymers described above, those of particular interest are the rubber-like materials resulting from (1) Polyethylene adipate modified by a meta tolylene diisocyanate, and by ethylene diamine, tetramethylene diamine, hexamethylene diamine, ethanol amine, benzidine; 4,4'-diamino diphenyl methane or mixtures thereof.

(2) Polypropylene 1,2-adipate modified by a meta tolylene diisocyanate, and by ethylene diamine, tetramethylene diamine, hexamethylene diamine, ethanol amine, benzidine, 4,4'-diamino diphenyl methane, or mixtures thereof.

(3) Polyethylene (80 mol percent) propylene 1,2 (20 mol percent) adipate modified by a meta tolylene diisocyanate, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by a meta tolylene diisocyanate, and by ethylene diamine, tetramethylene diamine, hexamethylene diamine, ethanol amine, benzidine; 4,4'-diamino diphenyl methane or mixtures thereof.

Mixtures of meta-tolylene diisocyanates such as mixtures of 2,4- and 2,6-tolylene diisocyanates may also be used.

Of the fourth class of elastomeric interpolymers described above, those of particular interest are the rubber-like materials resulting from (1) Polyethylene adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(2) Polypropylene 1,2 adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(3) Polyethylene (80 mol percent) propylene 1,2 (20 mol percent) adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

The amount of polyisocyanate required to cure or cross-link the chain-extended polymers and interpolymers described above must be held within certain limits. Any organic diisocyanate, polyisocyanate or mixtures of diisocyanates, polyisocyanates, or both, may be added in this step. When curing the polymers of the first and second classes, enough polyisocyanate must be added to the polymer so that the total amount of —NCO equivalents, including that added in the formation of the polymer, shall be from 2.80 to 3.20 equivalents per mol of polyester or polyesteramide. When curing the interpolymers of the third and fourth classes, enough polyisocyanate must be added to the interpolymer so that the total amount of —NCO equivalents, including that added in the formation of the interpolymer, shall be equal to the sum of from 2.80 to 3.20 equivalents per mol of polyester plus twice the molar amount of bifunctional additive used in preparing the interpolymer. Smaller amounts of polyisocyanate added to cure the polymer or interpolymer will result in an under-cured product. The use of greater amounts is a waste of material with no improved properties in the cured product and in some cases produces a cured material having properties more resinous than rubber-like. If a triisocyanate or tetraisocyanate is used in place of a diisocyanate to effect a cure, not as much material, on a mol basis, need be used, since the curing or cross-linking of the linear molecules depends upon the number of —NCO groups present in the curing agent. For example, if 0.50 mol of a diisocyanate gives a satisfactory cure of a diisocyanate-modified polyester or polyesteramide, the use of approximately 0.25 mol of a tetraisocyanate will result in a similar state of cure.

The actual curing of the elastomeric polymer is accomplished by methods familiar to those skilled in the art. The time and temperature required to effect the best cure for any particular material will, of course, vary as in the case with the curing of conventional natural rubber compounds. The cure for best results should be accomplished by the use of dry heat since exposure of the elastomeric polymer to hot water or steam results in a partial degradation of the cured material.

The following examples, in which parts are by weight, are illustrative of the preparation of polyesters, elastomeric diisocyanate-modified linear polyesters, and elastomeric diisocyanate-modified interpolymers and the curing of these materials.

*Example 1.—Preparation of a typical polyester*

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

*Example 2.—Preparation of the diisocyanate-modified polymer*

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 2270 parts of this polyester in a steam-heated Baker-Perkins mixer to 120° C., 4,4'-diphenyl diisocyanate (280.3 parts of 95.7% purity or 0.96 mol per mol of polyester) was added. After ten minutes of mixing the hot melt was poured into a Carnauba wax coated tray and baked for 8 hours at 130° C. The resulting polymer had excellent processing characteristics on a rubber mill. Tests showed the following physical properties—intrinsic viscosity 1.69, percent gel 3.9, plastic flow (1500 p. s. i. 212° F.) 85 seconds per inch, and softening point 186° C.

Table 1 shown below tabulates selected examples of unmodified polyesters and polyesteramides and uncured diisocyanate-modified polyesters and polyesteramides which were prepared according to the general procedure outlined in Examples 1 and 2.

TABLE I

| Example | Polyester | Acid No. | Hydroxyl No. | (—NH$_2$)[1] | Diisocyanate | R Value[2] | Rating |
|---|---|---|---|---|---|---|---|
| | | | | Percent | | | |
| 3 | A | 2.8 | 56.3 | 0 | A' | 0.95 | Excellent. |
| 4 | B | 0.6 | 61.8 | 5 | A' | 0.99 | Very good. |
| 5 | A | 0.4 | 56.7 | 0 | B' | 0.99 | Good. |
| 6 | C | 2.2 | 59.0 | 0 | A' | 0.99 | Do. |
| 7 | D | 1.0 | 59.3 | 0 | A' | 0.99 | Do. |
| 8 | A | 3.1 | 55.6 | 0 | C' | 0.99 | Do. |
| 9 | A | 0.4 | 56.7 | 0 | D' | 0.97 | Do. |
| 10 | A | 3.1 | 55.6 | 0 | E' | 0.99 | Do. |
| 11 | A | 3.1 | 55.6 | 0 | F' | 0.95 | Do. |

Polyester A—80 mol percent ethlene glycol-20 mol percent 1,2 propylene glycol-100 mol percent adipic acid.
Polyester B—80 mol percent ethylene glycol-10 mol percent 1,2 propylene glycol-10 mol percent ethanol amine-100 mol percent adipic acid.
Polyester C—1,2-propylene glycol-adipic acid.
Polyester D—80 mol percent ethylene glycol-20 mol percent 1,2-propylene glycol-97 mol percent adipic acid-3 mol percent maleic acid.
Diisocyanate A'—4,4'-diphenyl diisocyanate.
Diisocyanate B'—1,5-naphthalene diisocyanate.
Diisocyanate C'—4,4'-tolidine diisocyanate.
Diisocyanate D'—4,4'-diphenylene methane diisocyanate.
Diisocyanate E'—p-phenylene diisocyanate.
Diisocyanate F'—dianisidine diisocyanate.
[1] Percent —NH$_2$ groups of total —NH$_2$ and —OH groups.
[2] Mols of diisocyanate per mol of polyester or polyesteramide.

The rating indicated for each polymer is based upon its behavior on a rubber mill in relation to its processibility on the mill and on other rubber fabricating equipment. All of the diisocyanate-modified polymers described in Table I have been found to age at room temperature for periods in excess of one year with little or no apparent change in their processing characteristics. Some of these polymers have been found to age satisfactorily for as long as three years.

*Example 12.—Preparation of the diisocynate-modified polymer*

A quantity of polyester was prepared from adipic acid, ethylene glycol, and propylene, 1,2 glycol according to the general method and in substantially the same ratios as shown in Example 1. This polyester had an acid number of 3.1 and a hydroxyl number of 55.6. After heating 200 parts of this polyester to 120° C. in an iron kettle, 2,4-tolylene diisocyanate (20.11 parts of 99.7% purity or 1.10 mols of diisocyanate per mol of polyester) was added. After 15 minutes of mixing, the material was poured into a waxed aluminum tray and baked for 8 hours at 120° C. The resulting polymer had good processing characteristics on a rubber mill.

Table II shown below tabulates selected examples of unmodified polyesters and uncured diisocyanate-modified polyesters which were prepared according to the general procedures outlined in Examples 1 and 12.

TABLE II

| Example | Polyester | Hydroxyl No. | Acid No. | Diisocyanate | R Value[1] | Rating |
|---|---|---|---|---|---|---|
| 13 | A | 55.6 | 3.1 | G' | 1.0 | Excellent. |
| 14 | A | 55.6 | 3.1 | G' | 1.1 | Good. |
| 15 | A | 61.8 | 2.1 | G' | 0.99 | Excellent. |
| 16 | A | 53.5 | 2.2 | G' | 0.95 | Do. |

Polyester A—80 mol percent ethylene glycol-20 mol percent propylene 1,2-glycol-100 mol percent adipic acid.
Diisocyanate G'—2,4-tolylene diisocyanate.
[1] Mols of diisocyanate per mol of polyester.

The rating indicated for each polymer is based upon its behavior on a rubber mill in relation to its processibility on the mill and on other rubber fabricating equipment. The polymers described in Table II have been found to age at room temperature for long periods of time with little or no apparent change in their processing characteristics.

PREPARATION OF DIISOCYANATE-MODIFIED INTERPOLYMERS

*Example 17*

The polyester (200 parts) prepared according to Example 1 was heated in an open iron kettle to 120° C. To this were added 1.11 mols of 2,4 tolylene diisocyanate per mol of polyester and 0.06 mol of hexamethylene diamine per mol of polyester. After 15 minutes of mixing the material was poured into a waxed aluminum tray and baked for 8 hours at 120° C. The resulting interpolymer had excellent processing characteristics on a rubber mill.

*Example 18*

This interpolymer was prepared in the same manner as Example 17 except adipic acid was used as a molar replacement for the hexamethylene diamine. This product too had good processing characteristics on a rubber mill.

*Example 19*

This interpolymer was prepared in the same manner as Example 17 except ethanolamine was used as a molar replacement for the hexamethylene diamine. The processing characteristics of the material were good.

*Example 20*

A polyester was prepared from adipic acid, ethylene glycol and propylene glycol in the proportions and according to the procedure shown in Example 1. Analysis showed this polyester to have a hydroxyl number of 61.1 and an acid number of 1.9. To 2300 grams (1.29 mols) of this polyester were added 222 grams (1.266 mols) of mixture of 2,4-tolylene diisocyanate and 2,6-tolylene diisocyanate having a purity of 99.3%. The mixture was reacted for 10 minutes at 120° C. under constant agitation after which time 6.2 grams (.0508 mol) of 2,4-tolylene diamine were added. After an additional 10 minutes of mixing, 8.9 grams (.0508 mol) of the mixture of 2,4- and 2,6-tolylene diisocyanates were added. The reaction mixture was stirred for an additional 10 minutes after which it was poured into a waxed aluminum tray and baked for 16 hours at 129° C.

The modified but uncured interpolymer showed the following results when aged at room temperature for the times indicated:

TABLE III

| Age of sample | Percent Gel | Intrinsic Viscosity | Mooney Plasticity | Plastic Flow |
| --- | --- | --- | --- | --- |
| Original | None | 1.19 | 28 | 31 |
| 7 days | None | 1.45 | 37 | 73 |
| 14 days | None | 1.37 | 40 | 73 |
| 28 days | None | 1.47 | 35 | 79 |
| 56 days | None | 1.38 | 39 | 89 |

The percent gel and intrinsic viscosity were determined by methods well known in the art. The Mooney plasticities were run at 212° F. using a large rotor. The plastic flow test was run by extruding the material through an orifice under a constant pressure (500 pounds per square inch) and at a constant temperature (212° F.) and recording the time (in seconds) required to extrude a given length 1 inch through the orifice.

The test data shown in Table III indicates that there is no significant change in the physical properties of the uncured modified interpolymer even after aging for 8 weeks at room temperature, showing that the product is stable and storable.

PREPARATION OF CURED POLYMER

*Example 21*

The diisocyanate-modified polymer (100 parts) prepared according to Example 2 was mixed with 5.54 parts of 4,4'-diphenyl diisocyanate on a rubber mill, bringing the total amount of diisocyanate present in the cured compound to 1.46 mols per mol of polyester. Test sheets cured for 70 minutes at 300° F. showed the following physical properties:

Tensile _____ (pounds per square inch) __ 5150
Elongation _____ 705
Hardness (Shore Durometer Type A) _____ 64
Rebound at room temperature _____ percent __ 72.4
Rebound at 200° F. _____ do ____ 84.0
Abrasion (Bureau of Standards, D394-47
  Method B) _____ 200
Compression Set (A.S.T.M., D395-47T
  Method B) _____ 5.8

*Example 22*

The diisocyanate-modified polymer (100 parts) prepared according to Example 12 was mixed with 5.52 parts of 4,4'-diphenyl diisocyanate on a rubber mill, bringing the total amount of diisocyanate present in the cured compound to 1.59 mols per mol of polyester. Test sheets cured for 60 minutes at 300° F. showed the following physical properties:

Tensile _____ pounds per square inch __ 2600
Elongation _____ percent __ 710
300% Modulus _____ pounds per square inch __ 300

*Example 23*

The uncured modified interpolymer prepared according to Example 20 was mixed on a mill with the following ingredients. Parts are shown by weight:

Modified interpolymer _____ 100.00
White factice _____ 5.00
Carnauba wax _____ 2.00
Magnesium Oxide _____ 0.50
4,4'-diphenyl methane diisocyanate (83% pure) __ 4.00
Polyisocyanate mixture _____ 4.00

The polyisocyanate mixture used was prepared by the phosgenation of a mixture of primary polyamines formed from aniline and formaldehyde. The specific polyisocyanate mixture used had an amine equivalent of approximately 135. The preparation of these polyisocyanate mixtures is described in United States application Serial No. 206,506 filed January 17, 1951.

Test sheets from the compounded interpolymer cured for 15 minutes at 280° F. showed a tensile strength of 4100 pounds per square inch, an elongation at break of 630% and a hardness of 58 (Shore Durometer-Type A). Tests run according to the Bureau of Standards Abrasion determination on a sample cured for twenty minutes at 260° F. showed an abrasion value of 348.

According to this invention a means has been discovered to improve the physical properties of the cured elastomeric diisocyanate-modified polyesters and polyesteramides described above. The objects of this invention are accomplished by the use of chlorinated paraffin blended with the uncured diisocyanate-modified polymer.

The use of from 2 to 5 parts by weight of chlorinated paraffin per 100 parts of elastomer effects an improvement in the tensile strength of the cured elastomer. A preferred range is from 2 to 4 parts by weight while approximately 3 parts by weight of chlorinated paraffin is particularly useful. The degree of chlorination of the paraffin has an effect upon the amount of chlorinated paraffin used. The above ranges apply to paraffin which has been 40% chlorinated. Higher or lower chlorinated paraffins may be used in correspondingly smaller or larger amounts.

The following Table IV shows results obtained by mixing chlorinated paraffin into the diisocyanate-modified polymer. Amounts are shown in parts by weight. The term "Elastomer 1" denotes a diisocyanate-modified polyester prepared in accordance with the procedure outlined in Example 12. The diisocyanate used for cure was 1,5-naphthalene diisocyanate. The mixing of the materials was accomplished in an open mill in accordance with normal rubber compounding procedures.

TABLE IV

| | | |
| --- | --- | --- |
| Elastomer 1 | 100.00 | 100.00 |
| Diisocyanate | 5.60 | 5.60 |
| Chlorinated paraffin | | 5.00 |
| Tensile (pounds per square inch): | | |
|   Cure 15 minutes/240° F | 3,000 | 3,225 |
|   Cure 15 minutes/260° F | 3,100 | 4,050 |
|   Cure 15 minutes/280° F | 3,250 | 4,400 |
| Hardness (Shore—Type A): | | |
|   Cure 15 minutes/240° F | 55 | 55 |
|   Cure 15 minutes/260° F | 55 | 55 |
|   Cure 15 minutes/280° F | 58 | 56 |

The results shown in Table IV indicate that the use of chlorinated paraffin with the modified polymer results in a substantial improvement in the tensile strength of the cured polymer.

This application is a continuation-in-part of my copending application Serial Number 206,709 filed January 19, 1951, now abandoned.

While certain representative embodiments and details have been shown for the purpose of illustrating the invention, it will be apparent to those skilled in this art that various changes and modifications may be made therein without departing from the spirit or scope of the invention.

I claim:

1. A composition of matter comprising a mixture of chlorinated paraffin and an elastomeric isocyanate-modified linear polyester selected from the group consisting of (A) the reaction product resulting from the reaction of a mixture comprising (1) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total functional groups of said complementary bifunctional reactant, said material having a hydroxyl number from 40 to 100 and an acid number from 0 to 7, and (2) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the reaction product resulting from the reaction of a mixture comprising (3) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing groups being present in an amount not to exceed 30% of the total functional groups of said complementary bifunctional reactant, said material having a hydroxyl number from 30 to 140 and an acid number from 0 to 12, and (4) at least one tolylene diisocyanate used in an amount ranging from 0.85 to 1.10 mols per mol of said material; (C) the reaction product resulting from the reaction of a mixture comprising (5) a polyester prepared from bifunctional ingredients including at least one dibasic carboxylic acid containing at least three carbon atoms, and at least one glycol, said polyester having an hydroxyl number from 30 to 140 and an acid number from 0 to 12 (6) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH₂ and —COOH equivalents present in said bifunctional reactant shall be from 0.06 to 0.24 equivalent per mol of polyester, and (7) at least one tolylene diisocyanate used on an amount equal to the sum of from 0.85 mol to 1.10 mols of diisocyanate per mol of polyester plus the molar amount of diisocyanate equivalent to the mols of said bifunctional additive used, (D) the reaction product resulting from the reaction of a mixture comprising (8) a polyester prepared from bifunctional ingredients including at least one dibasic carboxylic acid containing at least three carbon atoms and at least one glycol, said polyester having a hydroxyl number between 40 and 100 and an acid number from 0 to 7, (9) at least one bifunctional additive selected from the group consisting of diamines, amino alcohol, dicarboxylic acids, amino carboxylic acids, hydroxy carboxylic acids, and the ureas, guanidines and thioureas containing a primary amino group, said bifunctional additive being used in an amount such that the total number of —NH₂ and —COOH equivalents present in said bifunctional reactant shall be from 0.06 to 0.48 equivalent per mol of polyester, and (10) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 mol of diisocyanate per mol of polyester plus the molar amount of diisocyanate equivalent to the mols of bifunctional additive used (A) and (B) being reacted with a sufficient amount of at least one polyisocyanate to bring the total number of —NCO equivalents present in said composition to from 2.80 to 3.20 equivalents per mol of said material and (C) and (D) being reacted with a sufficient amount of at least one polyisocyanate to bring the total number of —NCO equivalents present in said composition to the sum of from 2.80 to 3.20 equivalents per mol of said polyester plus twice the molar amount of bifunctional additive used in the preparation of said elastomeric reaction product.

2. A composition defined by claim 1 in which (2) of (A) is 4,4'-diphenyl diisocyanate used in an amount ranging from 0.90 to 0.99 mol per mol of said material.

3. A composition defined by claim 1 in which (4) of (B) is tolylene diisocyanate used in an amount ranging from 0.90 to 1.00 mol per mol of said material.

4. A composition defined by claim 1 in which (7) of (C) is tolylene diisocyanate used in an amount equal to the sum of from 0.90 to 1.00 mol of diisocyanate per mol of polyester plus the molar amount of diisocyanate equivalent to the mols of said bifunctional additive used.

5. A composition defined by claim 1 in which (10) of (D) is 4,4'-diphenyl diisocyanate used in an amount equal to the sum of from 0.90 to 0.99 mol per mol of polyester plus the molar amount of diisocyanate equivalent to the mols of bifunctional additive used.

6. A composition defined by claim 1 in which (10) of (D) is 4,4'-tolidine diisocyanate used in an amount equal to the sum of from 0.90 to 0.99 mol per mol of polyester plus the molar amount of diisocyanate equivalent to the mols of bifunctional additive used.

References Cited in the file of this patent

UNITED STATES PATENTS 2,424,885   Buist et al. _____ July 29, 1947